United States Patent
Chen et al.

(10) Patent No.: US 8,085,730 B2
(45) Date of Patent: Dec. 27, 2011

(54) METHOD, SYSTEM AND APPARATUS FOR BACKUPING HA/MAP IN MOBILE IPV6 NETWORK

(75) Inventors: Hongfei Chen, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 938 days.

(21) Appl. No.: 12/060,365

(22) Filed: Apr. 1, 2008

(65) Prior Publication Data

US 2008/0194244 A1 Aug. 14, 2008

Related U.S. Application Data

(63) Continuation of application No. PCT/CN2006/002586, filed on Sep. 29, 2006.

(30) Foreign Application Priority Data

Oct. 1, 2005 (CN) .......................... 2005 1 0100196

(51) Int. Cl.
*H04W 4/00* (2009.01)
(52) U.S. Cl. .................. 370/331; 370/221; 709/228
(58) Field of Classification Search .................. 455/418
See application file for complete search history.

(56) References Cited

U.S. PATENT DOCUMENTS

| | | | |
|---|---|---|---|
| 6,195,705 B1* | 2/2001 | Leung | 709/245 |
| 6,760,444 B1* | 7/2004 | Leung | 380/270 |
| 7,080,151 B1* | 7/2006 | Borella et al. | 709/230 |
| 7,697,501 B2* | 4/2010 | O'Neill | 370/349 |
| 2003/0182433 A1* | 9/2003 | Kulkarni et al. | 709/228 |
| 2004/0066749 A1* | 4/2004 | Watanabe | 370/242 |
| 2004/0202126 A1* | 10/2004 | Leung et al. | 370/331 |
| 2007/0104146 A1* | 5/2007 | Hossain et al. | 370/331 |

FOREIGN PATENT DOCUMENTS

| | | |
|---|---|---|
| CN | 1402437 A | 3/2003 |
| CN | 1568027 A | 1/2005 |
| CN | 1941769 B | 7/2010 |
| JP | 2004-343276 A | 12/2004 |

OTHER PUBLICATIONS

1st Office Action in corresponding Chinese Application No. 200510100196.2 (Jun. 5, 2009).
1st Office Action in corresponding European Application No. 06791172.7 (Feb. 5, 2009).

(Continued)

*Primary Examiner* — Chi Pham
*Assistant Examiner* — Kouroush Mohebbi
(74) *Attorney, Agent, or Firm* — Leydig, Voit & Mayer, Ltd.

(57) ABSTRACT

The disclosure provides a method, system and apparatus for backuping HA/MAP in mobile IPv6 network. In the disclosure, at least two HAs/MAPs form a redundant backup group. The at least two HAs/MAPs elect an active HA/MAP and a standby HA/MAP via the VRRP. When the active HA/MAP interacts the signaling message with a mobile node, the HA/MAP in backup status obtains the signaling message interacted by both of them in real time. When the active HA/MAP is invalid, the standby HA/MAP may take over the work in time so that the stability of the active node device of the network is ensured. During the exchange of the active HA/MAP and the standby HA/MAP, the solution ensures a smooth transition of the service.

9 Claims, 3 Drawing Sheets

OTHER PUBLICATIONS

International Search Report in corresponding PCT Application No. PCT/CN2006/002586 (Feb. 8, 2007).

Written Opinion of the International Searching Authority in corresponding PCT Application No. PCT/CN2006/002586 (Feb. 8, 2007).

Arkko et al., "RFC 3776- Using IPsec to Protect Mobile IPv6 Signaling Between Mobile Nodes and Home Agents," Network Working Group, Jun. 2004, The Internet Society, Reston, Virginia.

Deng et al., "Reliability and Load Balance among multiple Home Agents draft-deng-mip6-vrrp-homeagent-reliability-00.txt," MIP6/VRRP Working Group, Jul. 11, 2005, The Internet Society, Reston, Virginia.

Faizan et al., "Problem Statement: Home Agent Reliability draft-jfaizan-mipv6-ha-reliability-01.txt," Mobile IP Working Group, Feb. 2004, The Internet Society, Reston, Virginia.

Faizan et al., "Virtual Home Agent Reliability Protocol (VHAR) draft-jfaizan-mipv6-vhar-02.txt," Mobile IP Working Group, Apr. 2004, The Internet Society, Reston, Virginia.

Giaretta et al., "Mobile IPv6 bootstrapping in split scenario draft-ietf-mip6-bootstrapping-split-00.txt," MIP6 WG, Jun. 22, 2005, The Internet Society, Reston, Virginia.

Haley et al., "Mobility Header Home Agent Switch Message draft-haley-mip6-ha-switch-00.txt," Mobile IPv6, Apr. 2005, The Internet Society, Reston, Virginia.

Harkins et al., "RFC 2409—The Internet Key Exchange (IKE)," Network Working Group, Nov. 1998, The Internet Society, Reston, Virginia.

Hinden, "Virtual Router Redundancy Protocol for IPv6," Internet Draft, Sep. 28, 2004, The Internet Society, Reston, Virginia.

Johnson et al., "RFC 3775—Mobility Support in IPv6," Network Working Group, Jun. 2004, The Internet Society, Reston, Virginia.

Kent et al., "RFC 2401—Security Architecture for the Internet Protocol," Network Working Group, Nov. 1998, The Internet Society, Reston, Virginia.

Kent et al., "RFC 2402—IP Authentication Header," Network Working Group, Nov. 1998, The Internet Society, Reston, Virginia.

Kent et al., "RFC 2406—IP Encapsulating Security Payload (ESP)," Network Working Group, Nov. 1998, The Internet Society, Reston, Virginia.

Li et al., "Home Agent Initiated Bootstrap for Mobile IPv6 draft-li-mip6-ha-init-bootstrap-00.txt," MIP6 Working Group, Jul. 11, 2005, The Internet Society, Reston, Virginia.

Maughan et al., "RFC 2408—Internet Security Association and Key Management Protocol (ISAKMP)," Network Working Group, Nov. 1998, The Internet Society, Reston, Virginia.

Patel, "Problem Statement for bootstrapping Mobile IPv6 draft-ietf-mip6-bootstrap-ps-03," MIP6, Jul. 14, 2005, The Internet Society, Reston, Virginia.

Piper, "RFC 2407—The Internet IP Security Domain of Interpretation for ISAKMP," Network Working Group, Nov. 1998, The Internet Society, Reston, Virginia.

Soliman et al., "RFC 4140—Hierarchical Mobile IPv6 Mobility Management (HMIPv6)," Network Working Group, Aug. 2005, The Internet Society, Reston, Virginia.

Wakikawa et al., "Inter Home Agents Protocol (HAHA) draft-wakikawa-mip6-nemo-haha-01.txt," MIP6/NEMO Working Group, Feb. 16, 2004, The Internet Society, Reston, Virginia.

* cited by examiner

METHOD, SYSTEM AND APPARATUS FOR BACKUPING HA/MAP IN MOBILE IPV6 NETWORK

CROSS-REFERENCE TO RELATED APPLICATIONS

The application is a continuation of International Patent Application No. PCT/CN2006/002586, filed Sep. 29, 2006, which claims priority to Chinese Patent Application No. 200510100196.2 submitted with the State Intellectual Property Office of P.R.C. on Oct. 1, 2005, entitled "Method for Backuping HA/MAP in Mobile IPv6 Network," both contents of which are hereby incorporated by reference in their entirety.

FIELD OF THE INVENTION

The disclosure relates to the communication field, and more particularly, to a method for backuping the home agent or mobile anchor point (HA/MAP) in the mobile IIPv6 network.

BACKGROUND OF THE INVENTION

With the development of the network technique and the appearance of lots of mobile terminals, such as laptops, personal digital assistants (PDA), mobile telephones and mounted devices, an upsurge in the mobile computing is raised. More and more users may access the Internet via the public mobile wireless network by various terminals in any location. To meet the need of the mobile service, a mobile IP technique is introduced in the network layer.

In the Mobile IP technique, a mobile node (MN) may perform the IP communication by using the initial IP address all the time in the movement. Therefore, an upper layer application carried in the IP network layer may be ensured uninterrupted and continuable.

The operation principle of the Mobile IP is that when an MN is connected to its home network, the MN works in the same manner as other fixed nodes. If the MN finds itself moved to a foreign network, the care of address (CoA) on the foreign network is obtained by the stateful or stateless auto-configuration based on the received information announced by the router. Here, the MN owns the home address and the CoA at the same time. The MN registers its CoA to the home agent (HA) by a 'binding update' message. If the correspondence node (CN) of the MN does not know the CoA of the MN, the correspondence node sends the data packets to the home network of the MN according to the home address of the MN. The HA of the MN captures these data packets and transfers these data packets to the MN by using a tunnel mechanism according to the current CoA of the MN. The message sent by the MN to the CN is sent to the HA via a reverse tunnel, and is transferred to the CN by the HA. As the data packets between the CN and the MN are both transferred by the HA in that manner, the manner may be called 'triangle route' manner.

In the 'triangle route' manner, in order to ensure the upper layer application carried in the IP network layer to be uninterrupted and continuable in movement. A plurality of HAs may be set on the home link. In a prior art, when the current active HA is invalid, the switching process of the HA and the MN is as follows.

The MN detects the invalidation of the HA. Specifically, if the MN may not obtain the prefix of the home address from the HA or the MN may not complete the home registration with the HA, the MN detects the invalidation of the HA. In addition, if the MN fails to communicate with the outer CN via the HA, the MN may detect the invalidation of the HA.

The MN sends an HA address request to obtain a redundant HA address when the MN detects the invalidation of the HA. After obtaining the HA address by the MN, the MN sends a home link prefix request to get its own home address. Subsequently, the MN completes the home registration. The MN re-completes the process of the registration and communication with other CNs.

However, all the binding information retained in the invalid HA is lost. The real-time service is interrupted and the MN needs to re-establish the service connection, which costs greatly and consumes a lot of bandwidth.

Another method of the redundant backup for the HA/MAP. The basic scheme is shown as follows.

1. The HA on the same home link completes the election between the active HA/MAP and the standby HA/MAP by the virtual route redundancy protocol (VRRP).

2. When the active HA/MAP performs message interaction with the MN, the active HA/MAP creates a binding request and a binding update message by expanding the VRRP message to complete the backup of the binding database record from the active HA/MAP to the standby MA/MAP.

3. When the active HA/MAP is invalid, as the backup of the binding information is stored in the standby HA/MAP, the service flow (the triangle route) which is performing communication currently is not impacted and the standby HA/MAP may continually transfer the service between the MN and the CN.

The method creates the binding request and the binding update message by the manner of expanding the VRRP message to complete the backup of the binding database record from the active HA/MAP to the standby HA/MAP. The quality of the communication between the MN and the CN may not be ensured because the backup is not performed in real time.

In addition, as the key message of the security association (SA) has no backup (if the interaction is performed by using a dynamic key), when the CoA of the MN changes and needs to be re-registered by the HA, the MN needs to re-perform the key interaction with the new HA because the key negotiated before may not be retained. The process of the binding update of the MN is delayed.

SUMMARY OF THE INVENTION

The disclosure provides a method, system and apparatus for backuping an HA/MAP in a mobile IPv6 network to realize the real-time backup of the HA/MAP and enable a standby HA/MAP to take over seamlessly when an active HA/MAP is invalid.

A method for backuping a home agent or mobile anchor protocol (HA/MAP) in a mobile IPv6 network, at least two HAs/MAPs forming a redundant backup group includes following steps.

The at least two HAs/MAPs elect an active HA/MAP and a standby HA/MAP.

When the active HA/MAP performs a signaling message interaction with an MN, the standby HA/MAP obtains in real time a signaling message sent by the MN to the active HA/MAP and the signaling message sent by the active HA/MAP to the MN; or after performing the signaling message interaction with the MN, the active HA/MAP sends status information in real time to the standby HA/MAP via a synchronization message.

The standby HA/MAP elects a new active HA/MAP when the active HA/MAP is invalid.

Optionally, the step of obtaining in real time, by the standby HA/MAP, the signaling message sent by the MN to the active HA/MAP and a signaling message sent by the active HA/MAP to the MN specifically includes following steps.

A backup information channel is established among the standby HA/MAP, the active HA/MAP and the MN.

The standby HA/MAP obtains in real time the signaling message between the active HA/MAP and the MN via the backup information channel. The signaling message includes a binding update message and a key exchange message of a security association.

Optionally, the step of establishing the backup information channel is: forming the backup information channel by connecting the active HA/MAP, the standby HA/MAP and the MN to an outer switch located outside each outer link interface.

The step of obtaining in real time, by the standby HA/MAP, the signaling message between the active HA/MAP and the MN via the backup information channel specifically is that the outer switch copies the message sent by the MN to the active HA/MAP and the message sent by the active HA/MAP to the MN to the standby HA/MAP.

Optionally, after the standby HA/MAP obtains in real time the signaling message sent by the MN to the active HA/MAP and the signaling message sent by the active HA/MAP to the MN, the method further includes: processing the signaling message obtained in real time.

The step of processing the signaling message obtained in real time specifically includes following steps.

A new record is established in a backup database and marked as temporarily unusable after the standby HA/MAP has obtained a binding update request sent by the MN.

After that, the record is marked as usable or updated according to an obtained binding update acknowledgement message sent by the active HA/MAP.

Optionally, if the binding update request of the MN includes a home address created by the MN, the active HA/MAP repeatedly performs an address examination for the binding update message; if the home address of the MN is different from the home address of other MNs and an address of a local link node, the binding update acknowledgement message is the binding update acknowledgement message sent by the active HA/MAP directly to the MN.

If the home address of the MN is the same as the home address of other MNs and the address of the local link node, the binding update acknowledgement message is the binding update acknowledgement message including a suggested home address sent by the active HA/MAP to the MN.

If the binding update request of the MN includes the home address created by the MN, the binding update acknowledgement message is the binding update acknowledgement message including the home address initiatively allocated for the MN and sent by the active HA/MAP to the MN.

Optionally, the step of marking the record as usable or updating the record according to an obtained binding update acknowledgement message sent by the active HA/MAP specifically includes following steps.

When there is no home address in the binding update acknowledgement message sent by the active HA/MAP, the standby HA/MAP marks the new record as usable in the database.

When the binding update acknowledgement message sent by the active HA/MAP includes the home address initiatively allocated, the standby HA/MAP adds the allocated home address into the new record in the database.

When the binding update acknowledgement message sent by the active HA/MAP includes the suggested home address, the standby HA/MAP updates the new record as the suggested home address in the database.

Optionally, if the active HA/MAP creates the security association with the MN, the step of processing the signaling message obtained in real time specifically includes that the standby HA/MAP keeps real-time synchronization with a sending serial number and a receiving slip window of the active HA/MAP by analyzing the obtained signaling message between the active HA/MAP and the MN.

Optionally, the method further includes following steps.

When the HA/MAP resumes after invalidation, a current HA/MAP sends batch backup information to the HA/MAP; and The HA/MAP enters a real-time backup status after completing a batch backup.

The step of sending, by a current HA/MAP, batch backup information to the HA/MAP specifically includes following steps.

When the batch backup request sent by the HA/MAP includes the security policy database, the security association database, the Internet key exchange status information and the binding updated index information, a current active HA/MAP sends a backup response carrying a security policy database, a security association database, Internet key exchange status information and binding updated index information which are needed by the HA/MAP; when the batch backup request sent by the current HA/MAP does not includes backup information, needed by the current HA/MAP, the current active HA/MAP sends a backup response carrying the current security policy database, the security association database, the Internet key exchange status information and the binding updated index information to the HA/MAP.

A downloaded security policy database, the security association database, the Internet key exchange status information and the binding updated index information are determined after receiving the backup response of the current active HA/MAP by the HA/MAP; the batch backup request is resent to the current HA/MAP; backup information is downloaded and sent to the standby HA/MAP according to a re-received request by the current HA/MAP.

Optionally, the step of sending status information in real time to the standby HA/MAP via a synchronization message includes that the active HA/MAP synchronizes a key exchange status to the standby HA/MAP via the synchronization message when the active HA/MAP dynamically creates the security association with the MN.

The step of synchronizing, by the active HA/MAP, a key exchange status to the standby HA/MAP via the synchronization message specifically includes following steps.

When the MN and the active HA/MAP complete a first phase of the Internet key exchange, the active HA/MAP synchronizes a first phase status of the Internet key exchange to the standby HA/MAP.

When the MN and the active HA/MAP complete a second phase of the Internet key exchange, the active HA/MAP synchronizes a second phase status or the second phase and the first phase status of the Internet key exchange to the standby HA/MAP.

Optionally, the step of sending status information in real time to the standby HA/MAP via a synchronization message includes that the active HA/MAP backups binding cache information to the standby HA/MAP via the synchronization message.

According to another aspect of the disclosure, a system for backuping a home agent or mobile anchor protocol (HA/MAP) in a mobile IPv6 network includes a redundant backup group formed by at least two HAs/MAPs and the at least HAs/MAPs includes an elected active HA/MAP and a standby HA/MAP; the standby HA/MAP is adapted to obtain in real time a signaling message sent by the active HA/MAP to a mobile node (MN) and the signaling message sent by the MN to the active HA/MAP or is adapted to obtain status information in real time sent by the active HA/MAP via a synchronization message.

Optionally, the system further includes:

a backup information channel established among the standby HA/MAP, the active HA/MAP and the MN and adapted to transmit a message obtained in real time by the standby HA/MAP;

an outer switch located outside each outer link interface, connected to the active HA/MAP, the standby HA/MAP and the MN, and adapted to copy the message sent by the active HA/MAP to the MN and the message sent by the MN to the active HA/MAP to the standby HA/MAP.

An apparatus for backuping a home agent or mobile anchor point (HA/MAP) in an IPv6 network includes:

an interaction message obtaining unit, adapted to obtain a signaling message sent by a mobile node (MN) to an active HA/MAP and the signaling message sent by the active HA/MAP to the MN; and an interaction message sending unit, adapted to send in real time the obtained signaling message to a standby HA/MAP.

Optionally, the interaction message obtaining unit and the interaction message sending unit are set in an outer switch located outside each outer link interface.

Optionally, the apparatus further includes an interaction message processing unit set in an HA/MAP and adapted to process the signaling message from the interaction message sending unit when the HA/MAP is in a backup status.

Optionally, the interaction message processing unit includes a binding update message processing unit and an IP security message processing unit. The binding update message processing unit is adapted to establish a new record in a backup database according to an obtained binding update request sent by the MN, mark the record as temporarily unusable, and mark the record as usable or update the record according to an obtained binding update acknowledgement message sent by the active HA/MAP. The IP security message processing unit is adapted to analyze an obtained IP security message between the active HA/MAP and the MN to keep real-time synchronization with a sending serial number and a receiving slip window of the active HA/MAP.

Optionally, the apparatus further includes:

a batch backup request unit, set in the HA/MAP and adapted to send a batch backup request for the HA/MAP when an invalid active HA/MAP resumes and is elected as the standby HA/MAP;

a backup response unit, set in the HA/MAP and adapted to send a backup response to respond the batch backup request for a current active HA/MAP;

a backup response processing unit, set in the HA/MAP and adapted to obtain index information after receiving the backup response and inform the batch backup request unit to send a re-batch backup request carrying the index information of the backup information needing to download; and a backup information sending unit, set in the HA/MAP and adapted to send the backup information when the current active HA/MAP has received the re-batch backup request.

The disclosure makes the service information between the standby HA/MAP and the active HA/MAP real-time synchronous by the standby HA/MAP obtaining in real time the message interacted between the active HA/MAP and the MN or by the active HA/MAP sending in real time the backup information to the standby HA/MAP. Therefore, when the active HA/MAP is invalid, the standby HA/MAP may take over the work in real time, which ensures the stability of the active node devices in the network and minimally reduces the influence on the network operation by the single-point trouble.

According to the disclosure, the batch backup between the standby HA/MAP and the active HA/MAP is realized. In the period of the active-backup exchange, the present scheme ensures the smooth transmission of the service and makes the foreign and local MNs not to feel the change of the service flow.

DETAILED DESCRIPTION OF THE EMBODIMENTS

In order to make the objects, technical solutions and merits of the disclosure clearer, a further description of embodiments of the disclosure is given in conjunction with the accompanying drawings.

Figure 1:
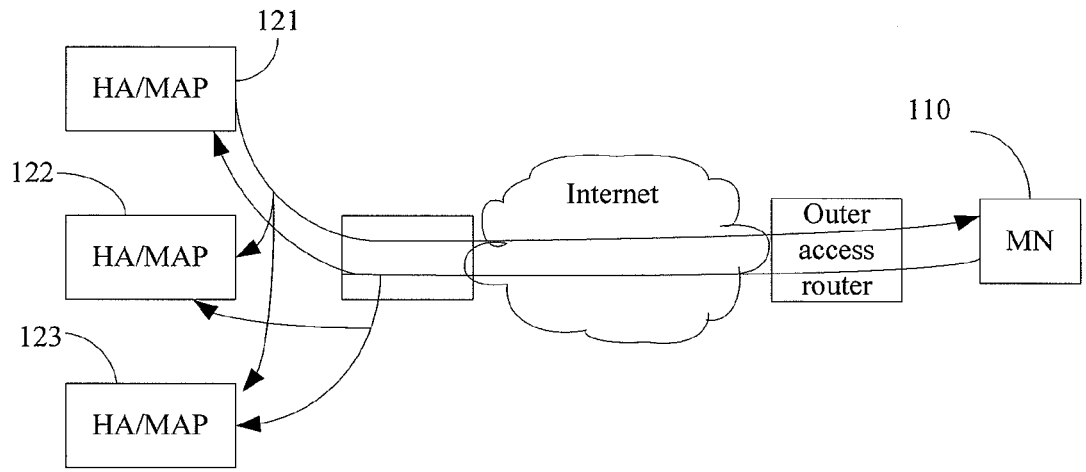
FIG. 1 is a schematic diagram illustrating the scheme of the basic network organization in accordance with an embodiment of the disclosure.

Referring to FIG. 1, one embodiment of the backup system in accordance with the disclosure is applied in the mobile IPv6 network. On the home link of the MN 110, HA/MAP 121, 122 and 123 form a redundant backup group. The HA/MAP 121, 122 and 123 elect HA/MAP 121 as an active HA/MAP and the HA/MAP 122, 123 as a standby HA/MAP.

When the active HA/MAP 121 performs message interaction with the MN 110, the HA/MAP 122, 123 in backup status obtain in real time the message sent by the MN 110 to the active HA/MAP 121 and the message sent by the active HA/MAP 121 to the MN 110 and process the message; or when the active HA/MAP 121 performs message interaction with the MN 110, the active HA/MAP 121 synchronizes in real time the status information to the HA/MAP 122, 123 in the backup status by a synchronization message.

Figure 2:
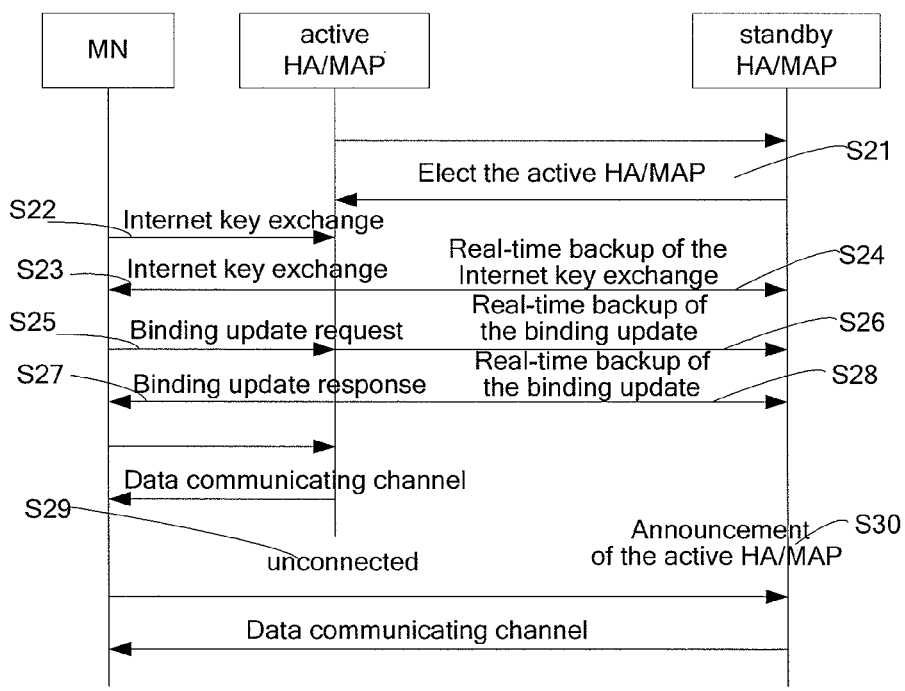
FIG. 2 is a schematic diagram illustrating the real-time backup in accordance with an embodiment of the disclosure.

Also referring to FIG. 2 which is a schematic diagram illustrating the real-time backup in accordance with the embodiment of the standby Method in the disclosure, the real-time backup process includes the following steps.

Step S21: On the home link of the MN, a plurality of HAs/MAPs forms the redundant backup group. Each HA/MAP elects the active HA/MAP by the VRRP protocol or a similar priority election protocol. The active HA/MAP communicates with an outer network by a virtual IPv6 address and a virtual medium access control address. The HA/MAP may share the global routable IP address to outside.

When the active HA/MAP performs message interaction with the MN, the HA/MAP in the backup status obtains in real time the message sent by the MN to the active HA/MAP and the message sent by the active HA/MAP to the MN, calculates the message, processes the message, and stores the result. In one embodiment of the disclosure, the specific process for obtaining in real time the message and processing the message includes following steps.

The configuration of the active HA/MAP is the same as the configuration of the standby HA/MAP, i.e. the security policy databases (SPD) of the active HA/MAP and the standby HA/MAP are the same. If the active HA/MAP and the standby HA/MAP establish the security association manually, the security association databases (SADB) of the active HA/MAP and the standby HA/MAP are also the same.

When the active HA/MAP establishes the security association with the MN (MN) by using an Internet key exchange (IKE) (Step S22, S23), the security association status (IKE/IPSec status) needs to be backuped to the standby HA/MAP (Step S24). Meanwhile, the index relationship between the security policy database SPD and the security association also needs to be backuped. The active HA/MAP may backup the established IKE/IPSec status to the standby HA/MAP by the synchronization message. The standby Message used may be an expanding message of the VRRP for IPv6.

The active HA/MAP may backup the established IKE/IPSec status to the standby HA/MAP by the synchronization message. The specific process is as follows.

When the MN MN completes the first phase exchange of the IKE with the active HA/MAP, the active HA/MAP may synchronize the status of the first phase (including the DH exchanging public values, initiating the nonce and so on) of the IKE to the standby HA/MAP.

When the MN MN completes the second phase exchange of the IKE with the active HA/MAP, the active HA/MAP may synchronize the status of the second phase or the status of the second phase and the first phase of the IKE to the standby HA/MAP.

In addition, the standby HA/MAP also needs to synchronize the sending serial number and the receiving slip window of the key message of the security association of the active HA/MAP. The standby HA/MAP keeps synchronization by obtaining and analyzing the mobile signaling message between the active HA/MAP and the MN. The standby HA/MAP may perform a security filtering to the received signaling message, i.e. the standby HA/MAP only receives the signaling message between the active HA/MAP and the MN so as to keep synchronization with the sending serial number and the receiving slip window of the key message of the security association of the active HA/MAP.

When the active HA/MAP performs the binding update with the MN, each HA/MAP in the backup status may also obtain the message sent by the MN to the active HA/MAP and the message sent by the active HA/MAP to the MN, calculate the binding update message, process the binding update message and stores the result. The specific process includes following steps.

When the active HA/MAP has received a binding update request (Step S25), the active HA/MAP sends different binding update acknowledge messages conditionally (Step S27). If the home address created by the MN itself is not included, the active HA/MAP directly sends the binding update acknowledge message to the MN. If the home address created by the MN itself is included, the active HA/MAP needs to examine the home address repeatedly. The examination method includes: inquiring a local home link neighbor database, sending a repeat address examination message or inquiring a neighbor agent. If the repeat address examination is passed, the active HA/MAP directly sends the binding update acknowledge message to the MN. If the repeat address examination is not passed, the suggested home address needs to be included in the binding update acknowledge.

After obtaining the binding update request (Step S26), the standby HA/MAP establishes a new record in the backup database and marks the record as temporarily unusable; and then marks the record as usable or updating the record according to the obtained binding update acknowledge message sent by the active HA/MAP (Step S28). When the home address field is not included in the binding update acknowledge message sent by the active HA/MAP, the standby HA/MAP marks the new record in the database as usable. When the allocated home address is included in the binding update acknowledge message sent by the active HA/MAP, the standby HA/MAP adds the allocated home address into the new record in the database. When the suggested home address is included in the binding update acknowledge message sent by the active HA/MAP, the standby HA/MAP updates the new record in the database to the suggested home address.

In addition, the active HA/MAP may also directly send the binding cache information to the standby HA/MAP.

Figure 3:
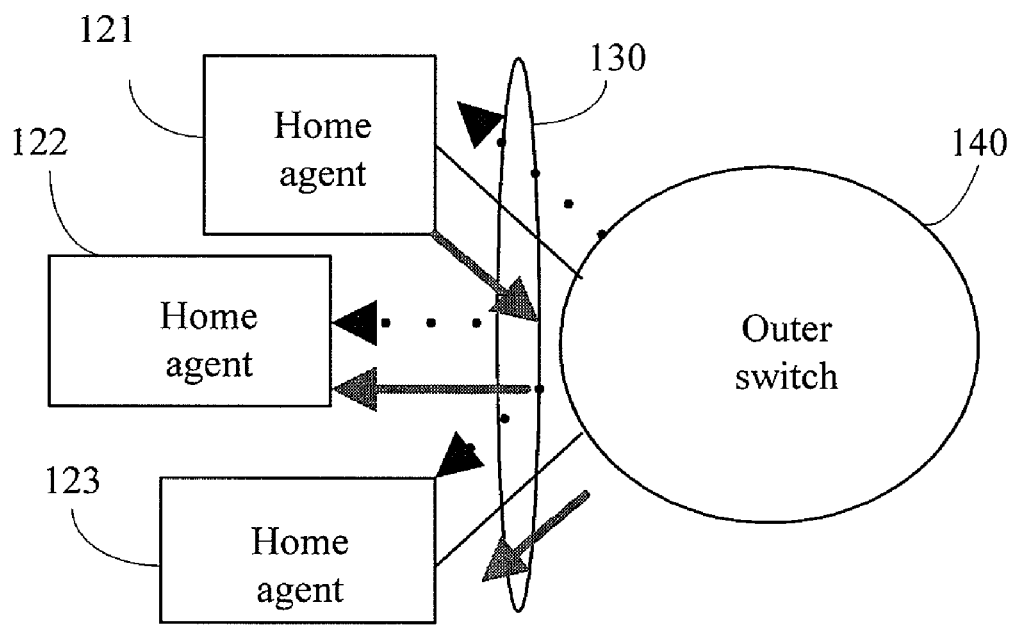
FIG. 3 is a schematic diagram illustrating that the standby HA/MAP obtaining in real time the signaling message in accordance with an embodiment of the disclosure.

The standby HA/MAP may obtain the signaling message between the active HA/MAP and the MN by establishing a backup information channel. One embodiment of the backup information channel is shown in FIG. 3. The backup information channel is established between each outer link interface 130 using the VRRP protocol. The signaling message sent by MN 110 to active HA/MAP 121 and the binding update message are copied by the switch 140 of the outer link to the standby HA/MAP 122, 123. Meanwhile, the signaling message sent by the active HA/MAP 121 to the MN 110 and the binding update message are also copied by the switch 140 of the outer link to the standby HA/MAP 122, 123. When the active HA/MAP is invalid (Step S29), by the VRRP protocol, the standby HA/MAP elects a new active HA/MAP to take over the work of the active HA/MAP and act as the new active HA/MAP (Step S30). The active HA/MAP may be invalid because of exception errors or maintaining requirement.

If a previous active HA/MAP resumes, it may be elected as a new standby HA/MAP by the VRRP protocol. The HA/MAP has no information recorded in the security policy database, in the security association database and in the binding update database. The information needs to be obtained from the current active HA/MAP for completing the backup work. Although the previous active HA/MAP is the owner of the virtual IPv6 address, the previous active HA/MAP may be elected as a new active HA/MAP only after downloading the backup information in batch-bulk from the current active HA/MAP.

Figure 4:
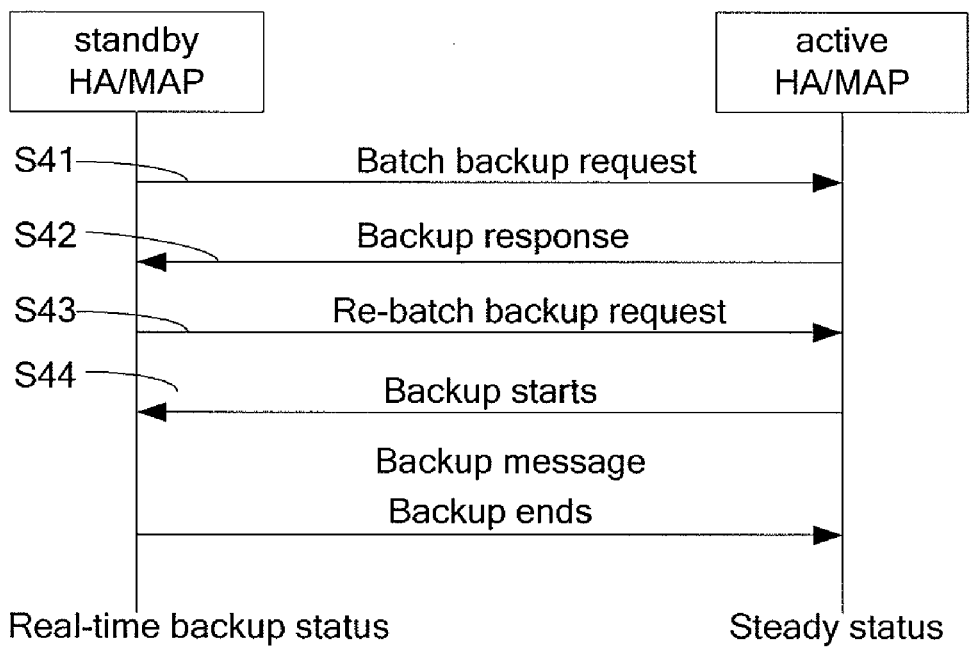
FIG. 4 is a schematic diagram illustrating the batch backup in accordance with an embodiment of the disclosure.

FIG. 4 is a schematic diagram illustrating that the standby HA/MAP backups the message information of the current active HA/MAP in batch-bulk. The process of batch backup includes following steps.

Step S41: When the previous active HA/MAP resumes, the previous active HA/MAP is elected as the new standby HA/MAP by the VRRP protocol. The standby HA/MAP initiates a batch backup request to the active HA/MAP;

Step S42: When the active HA/MAP receives the batch backup request sent by the standby HA/MAP, the active HA/MAP sends a backup response. The specific process includes as follows.

Firstly, the active HA/MAP determines whether the standby HA/MAP carries the index of the backup information needed. If the standby HA/MAP carries the index of the backup information needed, the current active HA/MAP sends the backup response carrying the security policy database, the security association database, the status information of the Internet key exchange and the index information of the binding update needed by the standby HA/MAP. When the batch backup request sent by the HA/MAP does not include the backup information needed, the current active HA/MAP sends the backup response carrying the current security policy database, the security association database, the status information of the Internet key exchange and the index information of the binding update to the HA/MAP.

Step S43: When the HA/MAP receives the response of the current active HA/MAP, the HA/MAP determines to download security policy database, the security association database, the status information of the Internet key exchange and the index information of the binding update according to its own need and re-sends a batch backup request to the current active HA/MAP.

Step S44: According to the re-received download request, the current active HA/MAP sends the backup information to the standby HA/MAP.

After completing the batch backup, the standby HA/MAP enters the real-time backup status.

Figure 5:
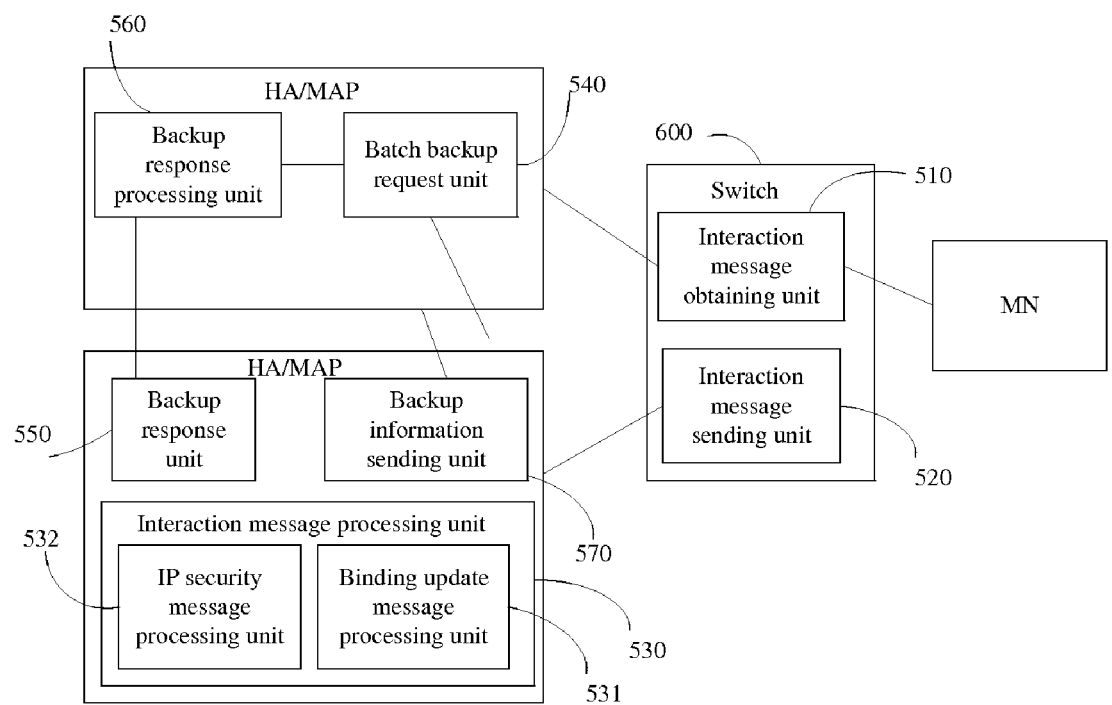
FIG. 5 is a block diagram illustrating the backup apparatus in accordance with an embodiment of the disclosure.

Referring to FIG. 5, it is a block diagram illustrating the backup apparatus of the HA/MAP in accordance with an embodiment of the disclosure.

The backup apparatus includes: an interaction message obtaining unit 510 adapted to obtain the signaling message sent by the MN to the active HA/MAP and the signaling message sent by the active HA/MAP to the MN; and an interaction message sending unit 520 adapted to send in real time the obtained signaling message to the standby HA/MAP.

In one embodiment of the disclosure, the interaction message obtaining unit 510 and the interaction message sending unit 520 are set in the outer switch 600 located outside each outer link interface.

The backup apparatus further includes an interaction message processing unit 530 set in the HA/MAP adapted to process the signaling message from the interaction message sending unit 520 when the HA/MAP is in the backup status.

The interaction message processing unit 530 includes a binding update message processing unit 531 and an IP security message processing unit 532.

The binding update message processing unit 531 is adapted to establish a new record in the backup database according to the obtained binding update request sent by the MN and to mark the record as temporarily unusable; and mark the record as usable or update the record according to the obtained binding update acknowledgement message sent by the active HA/MAP.

The IP security message processing unit 532 is adapted to analyze the obtained IP security message between the active HA/MAP and the MN to keep real-time synchronization with the sending serial number and the receiving slip window of the active HA/MAP.

In addition, after resuming, an invalid previous active HA/MAP may be elected as a new standby HA/MAP by the VRRP protocol. The HA/MAP has no information recorded in the security policy database, in the security association database and in the binding update database. The previous active HA/MAP may be elected as a new active HA/MAP only after downloading the backup information from the current active HA/MAP in batch-bulk. In order to realize the batch backup, the backup apparatus further includes:

a batch backup request unit 540 set in the HA/MAP and adapted to send a batch backup request for the HA/MAP when the invalid active HA/MAP resumes and is elected as the standby HA/MAP;

a backup response unit 550 set in the HA/MAP and adapted to send a backup response to respond the batch backup request for the current active HA/MAP;

a backup response processing unit 560 set in the HA/MAP and adapted to obtain the index information after receiving the backup response and inform the batch backup request unit 540 to send a re-batch backup request carrying the index information of backup information needing to be downloaded; and a backup information sending unit 570 set in the HA/MAP and adapted to send the backup information when the current active HA/MAP received the re-batch backup request.

Though illustration and description of the present disclosure have been given with reference to embodiments thereof, it should be appreciated by persons of ordinary skill in the art that various changes in forms and details can be made without deviation from the scope of this disclosure, which are defined by the appended claims.

What is claimed is:

1. A method for backing up a home agent or mobile anchor point (HA/MAP) in a mobile Ipv6 network, at least two HAs/MAPs forming a redundant backup group, comprising:

electing, from at least two HAs/MAPs, an active HA/MAP and a standby HA/MAP;

obtaining in real time, by the standby HA/MAP, a signaling message sent by a mobile node (MN) to the active HA/MAP and a signaling message sent by the active HA/MAP to the MN when the active HA/MAP performs a signaling message interaction with the MN; or sending status information in real time to the standby HA/MAP, by the active HA/MAP, via a synchronization message after the active HA/MAP performs the signaling message interaction with the MN; and electing, from the standby HA/MAP, a new active HA/MAP when the active HA/MAP is invalid;

wherein after the standby HA/MAP obtains in real time the signaling message sent by the MN to the active HA/MAP and the signaling message sent by the active HA/MAP to the MN, the method further comprises:

processing the signaling message sent by the MN to the active HA/MAP and the signaling message sent by the active HA/MAP to the MN obtained in real time, wherein the processing further comprises:

establishing a new record in a backup database and marking the record as temporarily unusable after the standby HA/MAP has obtained a binding update request sent by the MN; and marking the record as usable or updating the record according to an obtained binding update acknowledgement message sent by the active HA/MAP;

wherein if the binding update request of the MN comprises a home address created by the MN, the active HA/MAP repeatedly performs an address examination for the binding update message;

if the home address of the MN is different from the home address of other MNs and an address of a local link node, the binding update acknowledgement message is the binding update acknowledgement message sent by the active HA/MAP directly to the MN;

if the home address of the MN is the same as the home address of other MNs and the address of the local link node, the binding update acknowledgement message is the binding update acknowledgement message comprising a suggested home address sent by the active HA/MAP to the MN; and if the binding update request of the MN comprises the home address created by the MN, the binding update acknowledgement message is the binding update acknowledgement message comprising the home address initiatively allocated for the MN and sent by the active HA/MAP to the MN.

2. The method according to claim 1, wherein the obtaining in real time the signaling message comprises:

establishing a backup information channel among the standby HA/MAP, the active HA/MAP and the MN; and obtaining in real time, by the standby HA/MAP, the signaling message between the active HA/MAP and the MN via the backup information channel, wherein the signaling message comprises a binding update message and a key exchange message of a security association.

3. The method according to claim 2, wherein the establishing the backup information channel is: forming the backup information channel by connecting the active HA/MAP, the standby HA/MAP and the MN to an outer switch located outside each outer link interface, wherein the obtaining in real time the signaling message between the active HA/MAP and the MN via the backup information channel specifically is:

copying, by the outer switch, the message sent by the MN to the active HA/MAP and the message sent by the active HA/MAP to the MN to the standby HA/MAP.

4. The method according to claim 1, wherein the marking the record as usable or updating the record comprises:

marking, by the standby HA/MAP, the record as usable in the database when there is no home address in the binding update acknowledgement message sent by the active HA/MAP;

adding, by the standby HA/MAP, the allocated home address into the record in the database when the binding update acknowledgement message sent by the active HA/MAP comprises the home address initiatively allocated; and updating, by the standby HA/MAP, the record as the suggested home address in the database when the binding update acknowledgement message sent by the active HA/MAP comprises the suggested home address.

5. The method according to claim 1, further comprising:

sending, by a current HA/MAP, batch backup information to the HA/MAP when the HA/MAP resumes after invalidation; and entering a real-time backup status after the HA/MAP completes a batch backup, wherein the sending batch backup information to the HA/MAP specifically comprises:

sending, by a current active HA/MAP, a backup response carrying a security policy database, a security association database, Internet key exchange status information and binding updated index information which are needed by the HA/MAP when the batch backup request sent by the HA/MAP comprises the security policy database, the security association database, the Internet key exchange status information and the binding updated index information; sending, by the current active HA/MAP, a backup response carrying the current security policy database, the security association database, the Internet key exchange status information and the binding updated index information to the HA/MAP when the batch backup request sent by the current HA/MAP does not comprise backup information, needed by the current HA/MAP; and determining to download security policy database, the security association database, the Internet key exchange status information and the binding updated index information after receiving the backup response of the current active HA/MAP by the HA/MAP; resending the batch backup request to the current HA/MAP; downloading and sending backup Information to the standby HA/MAP according to a re-received request by the current HA/MAP.

6. The method according to claim 1, wherein the sending status information in real time to the standby HA/MAP via a synchronization message comprises: synchronizing, by the active HA/MAP, a key exchange status to the standby HA/MAP via the synchronization message when the active HA/MAP dynamically creates the security association with the MN, wherein the synchronizing a key exchange status to the standby HA/MAP further comprises:

synchronizing, by the active HA/MAP, a first phase status of the Internet key exchange to the standby HA/MAP when the MN and the active HA/MAP complete a first phase of the Internet key exchange; and synchronizing, by the active HA/MAP, a second phase status or a second phase and the first phase status of the Internet key exchange to the standby HA/MAP when the MN and the active HA/MAP complete the second phase of the Internet key exchange.

7. The method according to claim 1, wherein the sending status information in real time to the standby HA/MAP via a synchronization message comprises: backing up, by the active HA/MAP, binding cache information to the standby HA/MAP via the synchronization message.

8. An apparatus for backing up a home agent or mobile anchor point (HA/MAP) in an Ipv6 network, comprising:

an interaction message obtaining unit adapted to obtain a signaling message sent by a mobile node (MN) to an active HA/MAP and a signaling message sent by the active HA/MAP to the MN; and an interaction message sending unit adapted to send in real time the obtained signaling message to a standby HA/MAP;

a batch backup request unit set in the HA/MAP and adapted to send a batch backup request for the HA/MAP when an invalid active HA/MAP resumes and is elected as the standby HA/MAP;

a backup response unit set in the HA/MAP and adapted to send a backup response to respond the batch backup request for a current active HA/MAP;

a backup response processing unit set in the HA/MAP and adapted to obtain index information after receiving the backup response and inform the batch backup request unit to send a re-batch backup request carrying the index information of the backup information needing to be downloaded; and a backup information sending unit set in the HA/MAP and adapted to send the backup information when the current active HA/MAP has received the re-batch backup request.

9. The apparatus according to claim 8, wherein the interaction message obtaining unit and the interaction message sending unit are set in an outer switch located outside each outer link interface.

* * * * *